(12) United States Patent
Müller

(10) Patent No.: US 7,207,120 B2
(45) Date of Patent: Apr. 24, 2007

(54) SCANNING HEAD FOR A MEASURING DEVICE

(75) Inventor: Hans-Jürgen Müller, Braunfels (DE)

(73) Assignee: Hexagon Metrology GmbH, Wetzlar (DE)

( * ) Notice: Subject to any disclaimer, the term of this patent is extended or adjusted under 35 U.S.C. 154(b) by 0 days.

(21) Appl. No.: 11/302,915

(22) Filed: Dec. 14, 2005

(65) Prior Publication Data

US 2006/0123649 A1 Jun. 15, 2006

(30) Foreign Application Priority Data

Dec. 15, 2004 (EP) .................... 04029649

(51) Int. Cl.
*G01B 5/012* (2006.01)

(52) U.S. Cl. .......................... 33/559; 33/503

(58) Field of Classification Search ................. 33/503, 33/556, 558, 559, 561
See application file for complete search history.

(56) References Cited

U.S. PATENT DOCUMENTS

| | | | |
|---|---|---|---|
| 3,869,799 A * | 3/1975 | Neuer et al. .................. 33/561 |
| 5,088,208 A | 2/1992 | Wells et al. |
| 5,259,122 A * | 11/1993 | Ichiba et al. .................. 33/561 |
| 2004/0128848 A1* | 7/2004 | Szenger et al. ............... 33/561 |
| 2004/0255703 A1* | 12/2004 | Takai ........................... 33/558 |
| 2005/0283990 A1* | 12/2005 | McMurty et al. ............. 33/556 |
| 2006/0070253 A1* | 4/2006 | Ruijl et al. .................... 33/559 |

FOREIGN PATENT DOCUMENTS

| | | |
|---|---|---|
| DE | 150 111 | 8/1981 |
| DE | 3106031 | 12/1981 |
| DE | 3520685 | 2/1986 |
| EP | 0 693 669 | 5/1997 |

OTHER PUBLICATIONS

Semiconductor Switching Technology, Springer-Verlag 1991, p. 381. (Enclosed) (Spec. p. 8).

* cited by examiner

*Primary Examiner*—G. Bradley Bennett
(74) *Attorney, Agent, or Firm*—Collard & Roe, P.C.

(57) ABSTRACT

A scanning head of the measuring type for a coordinate measurement system, has a fixed part, at least one part that is displaceable relative to the fixed part, and at least one damping device for damping vibrations that occur. The at least one damping device is configured as an electric motor, which is connected with at least one negative ohmic resistor.

9 Claims, 3 Drawing Sheets

SCANNING HEAD FOR A MEASURING DEVICE

BACKGROUND OF THE INVENTION

The invention relates to a scanning head of the measuring type for a coordinate measuring device. These scanning heads consist of a fixed part that is connected with a device that can freely move and position the scanning head in three spatial dimensions, within a defined measurement volume, usually a so-called coordinate measurement device, as well as of three parts that are movable with regard to the fixed part. The movable parts are frequently configured as rockers with a parallel spring plate guide, which allows precise guidance in one spatial direction. The movement directions are usually disposed orthogonal to one another, and all of the other degrees of freedom are set. The movement directions of the three rockers build on one another kinematically, so that the last rocker of the kinematic chain is freely movable within a movement play space in the form of a cube having an edge length of typically a few millimeters. Furthermore, re-set elements are provided, which bring the scanning head rockers into a resting position, which lies approximately in the center of the movement play space, if no external forces are acting on the rockers. Furthermore, position measurement devices are provided, which measure the deviation from the resting position of the individual rockers, and thereby define a deflection vector of the kinematically last rocker. The zero points of these position measurement devices usually define the said resting position.

Usually, a mechanical interface is provided on the last rocker, which allows an automatic switching of so-called feeler combinations. This interface consists of a kinematically defined bearing that precisely establishes all six kinematic degrees of freedom, so that during repeated setting of the same feeler combinations, the relative position between the scanning head rocker and this feeler combination is reproduced as precisely as possible.

In the case of tactile measurement of work pieces, using a coordinate measurement device, to which a scanning head as described above is attached, undesirable vibrations both of the support structures of the coordinate measurement device and of the scanning head rockers occur, particularly during continuous scanning of work pieces, leading to measurement errors. Vibrations of the scanning head rockers, in particular, result in oscillations of the scanning forces, which in turn result in changes in the feeler bending, which are not detected during feeler calibration and therefore cannot be corrected. This becomes evident, in particular, in the case of long and easily bendable feelers. There are a number of proposals in the state of the art with regard to this problem, as to how these undesirable vibrations can be damped.

U.S. Pat. No. 5,088,208 includes a measuring scanning head that carries a damping device that consists of a cylinder in which a viscous fluid (silicone) is located, and a punch that projects into this fluid. The damping effect is achieved in that the punch and the cylinder are rigidly connected with the components of the scanning head that move relative to one another, in each instance.

This damping device, which is part of the state of the art, has the disadvantage that the fluid can flow out of the cylinder. This problem was solved in U.S. Pat. No. 5,088,208 by means of an elastomer cuff that surrounds the punch and the cylinder. This solution, however, in turn has the disadvantage that the cuff exerts undefined additional forces on the parts of the scanning head that move towards one another. Furthermore, such a cuff cannot be configured to be absolutely leak-proof, and this can result in undesirable creep of the silicone out of the cuff. Furthermore, this passive damping device has the disadvantage that it is always engaged, and this results in additional forces that in turn bend the scanning pin in case of fast changes in load at the scanning head rocker, and this results in measurement errors.

If a friction-free or at least low-friction electric motor, for example a plunger-type coil system or a different type of DC linear motor is used, which is connected with the mechanical vibration system, speed-proportional damping that is adjustable to almost any desired value can be set. This electric motor is disposed between the movable part and the fixed part of a rocker, in such a way that it can exert forces on the movable part. Of course, motors that act in rotary manner can also be used, which are mechanically coupled with the rockers in such a manner that the rotation movement is converted to a linear movement. According to the state of the art, such motors are controlled by feedback control circuits in order to damp vibrations; these control circuits use at least one status variable of the mechanical vibration system in order to generate a braking force that acts opposite to the movement direction of the mechanical vibration system. This is done in that the regulator supplies the electric motor with electrical power, as a function of the observed status variable, so that the desired braking effect is achieved. However, stability criteria of regulation technology must be adhered to. If tactile scanning is used as the basis, greatly varying feeler weights, and, depending on the scanning direction, greatly different spring stiffness values of the bending feelers, result in a large parameter bandwidth that generally results in a compromise on the basis of the stability criteria that must be met (for example, great damping is given up), or results in a complicated regulation strategy.

German Patent No. DD 150 111 includes a device for path/force coordination on feeler systems for scanning heads on coordinate measurement devices. This reference describes how damping of the movement of the movable part of a scanning head for coordinate measurement systems is performed. For this purpose, the path signal of the path measurement device of the movable scanning head part, in each instance, is applied as an override to the linear motor, by means of a differential regulator (D regulator) of the path measurement device. The D regulator differentiates the path signal and thereby obtains a signal proportional to the speed, which is processed further by the regulator. The disadvantages of this regulator have already been described above. The advantages of the regulators lie in the flexibility, since the amount of the damping force can be adjusted by means of changing the regulator parameters.

Furthermore, a scanning head for coordinate measurement devices having a damping device that is based on the eddy current principle is described in European Patent No. 0 693 669 B1. For this purpose, it is necessary to introduce an additional piece of metallic conductor in the field region of the magnets of the linear motor described in EP 0 693 669 B1 (plunger-type coils), which piece is displaced relative to the magnetic field lines when the movable part of the scanning head is deflected. According to EP 0 693 669 B1, the use of metallic coil bodies is proposed for the plunger-type coils. By means of the displacement, eddy currents that are closed in themselves are induced in the metallic coil body, which currents in turn establish a magnetic field that is directed opposite to the magnetic field that generates them. In this way, a force is generated that is directed opposite to the movement and thereby damps it. It is a disadvantage that the amount of the current and therefore of the counter-force is limited by the electrical resistance that is inherent to every electrical conductor at room temperature. Furthermore, the proportionality factor, which links the speed of the movement to be damped with the damping force, cannot be changed. The damping force is proportional to the speed of the movable scanning head part and is dependent, in terms of its amount, only on the magnetic field intensity, the geometry of the components, and the specific resistance of the metal part in which the eddy currents flow. The advantage of this damping device lies in its sturdiness, since in contrast to the regulator, no stability criteria need to be observed.

SUMMARY OF THE INVENTION

It is therefore an object of the invention to provide a scanning head of the measuring type for a coordinate measurement system having a damping device, which combines the flexibility of a regulator with the sturdiness of the eddy current principle.

This object is accomplished by a scanning head having a fixed part and at least one moveable part, and having at least one damping device for damping vibrations that occur. The damping device is configured as an electric motor which is connected with at least one negative ohmic resistor.

The damping device is preferably configured as a friction-free DC linear motor that is connected with at least one negative ohmic resistor. The scanning head according to the invention, having the damping device, is very flexible and, at the same time, robust.

Of course, different coil and magnet arrangements other than so-called plunger-type coil systems are possible, which generate a force that acts relative to the magnet when current flows through the coil: For example, a combination of a flat coil and a horseshoe magnet, in the air gap of which the flat coil is disposed in such a manner that its axis of symmetry, around which the coil is wound, runs parallel to the magnetic field lines. The horseshoe magnet is connected with the fixed part, for example, whereas the flat coil is connected with the at least one movable part of the scanning head, or vice versa. The concrete structural shape of the electromagnetic arrangement that generates force does not change anything with regard to the fundamental advantages and disadvantages of the methods described above.

If the winding resistance of a coil is almost compensated at room temperature, by connecting a negative ohmic resistance to the connector terminals, almost any desired current intensities are induced in the coil by means of the relative movement of the coil and the magnet, and this consequently allows the damping to increase suddenly. Because of this fact, the coils for use in the measurement head can be built very small, with the toleration of a higher winding resistance caused by thin winding wire, which is then compensated. The damping can be adjusted within broad ranges by means of the selection of the negative ohmic resistance value relative to the winding resistance. In contrast to the regulator, there is no status variable of the vibrating mechanical system here that should be regulated to a reference value, which variable would have to be monitored using a sensor. In contrast to the eddy current brake, the damping effect can be influenced, within broad limits, by manipulating the parameters of the negative resistance.

It is advantageous if the negative ohmic resistance is generated using a "Negative Impedance Converter," referred to hereinafter as NIC. This is a "Black Box" having two connectors at which the negative ohmic resistance can be measured. The structure of an NIC is the state of the art (Tietze/Schenk, Halbleiter-Schaltungstechnik [Semiconductor switching technology], Springer-Verlag 1991, page 381). The NIC does not require any kind of data about the status variables of the mechanical vibration system. For this reason, the aforementioned stability criteria of a closed regulation circuit do not apply. If the structure of the NIC is suitable, the negative ohmic resistance can be adjusted by means of hardware or software. Because the NIC must be implemented by means of an active circuit, it is preferably disposed outside of the measurement head, because it heats up.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
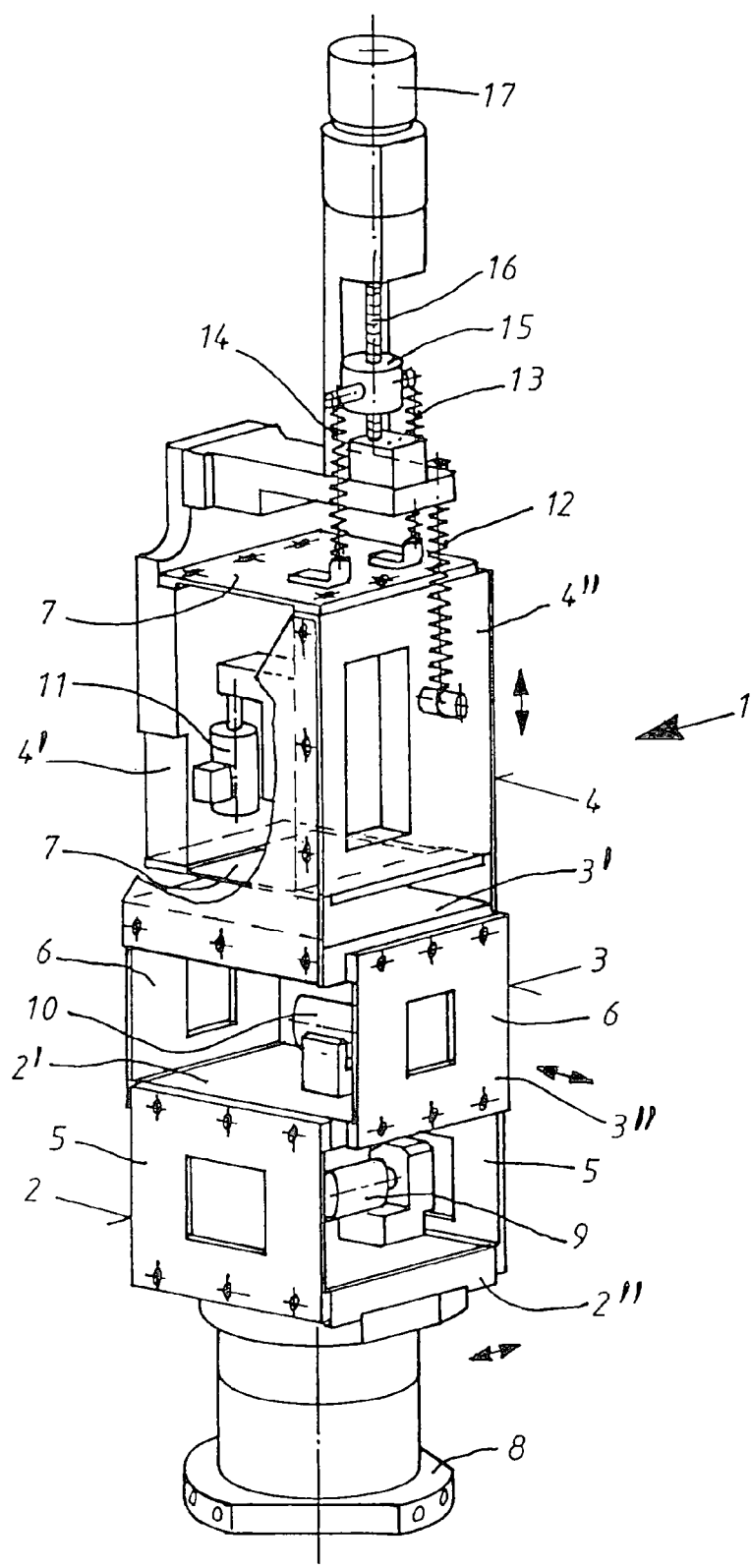
FIG. 1 shows a scanning head of the measuring type in a perspective view.

Referring now in detail to the drawings, FIG. 1 shows a measuring scanning head 1, as it is known according to the state of the art. The scanning head 1 has three scanning head rockers 2, 3, 4. Scanning head rockers 2, 3, 4 allow deflection of the scanning head in the x, y und z direction. For this purpose, the scanning head rockers have a fixed part 2', 3', 4' and a movable part 2", 3", 4", relative to the fixed parts, in each instance. The fixed parts 2', 3', 4' and the movable parts 2", 3", 4" are connected with one another by way of spring plates 5, 6, 7, so as to be displaceable relative to one another, in each instance.

A scanning pin (not shown) is attached to a feeler pickup 8. Each scanning head rocker has a path measurement system 9, 10, 11, in each instance. Scanning head 1 has weight equalization springs 12, 13, 14 that are connected with a spindle nut 15. A spindle 16 is driven by a motor 17, in order to move the spindle nut.

Figure 2:
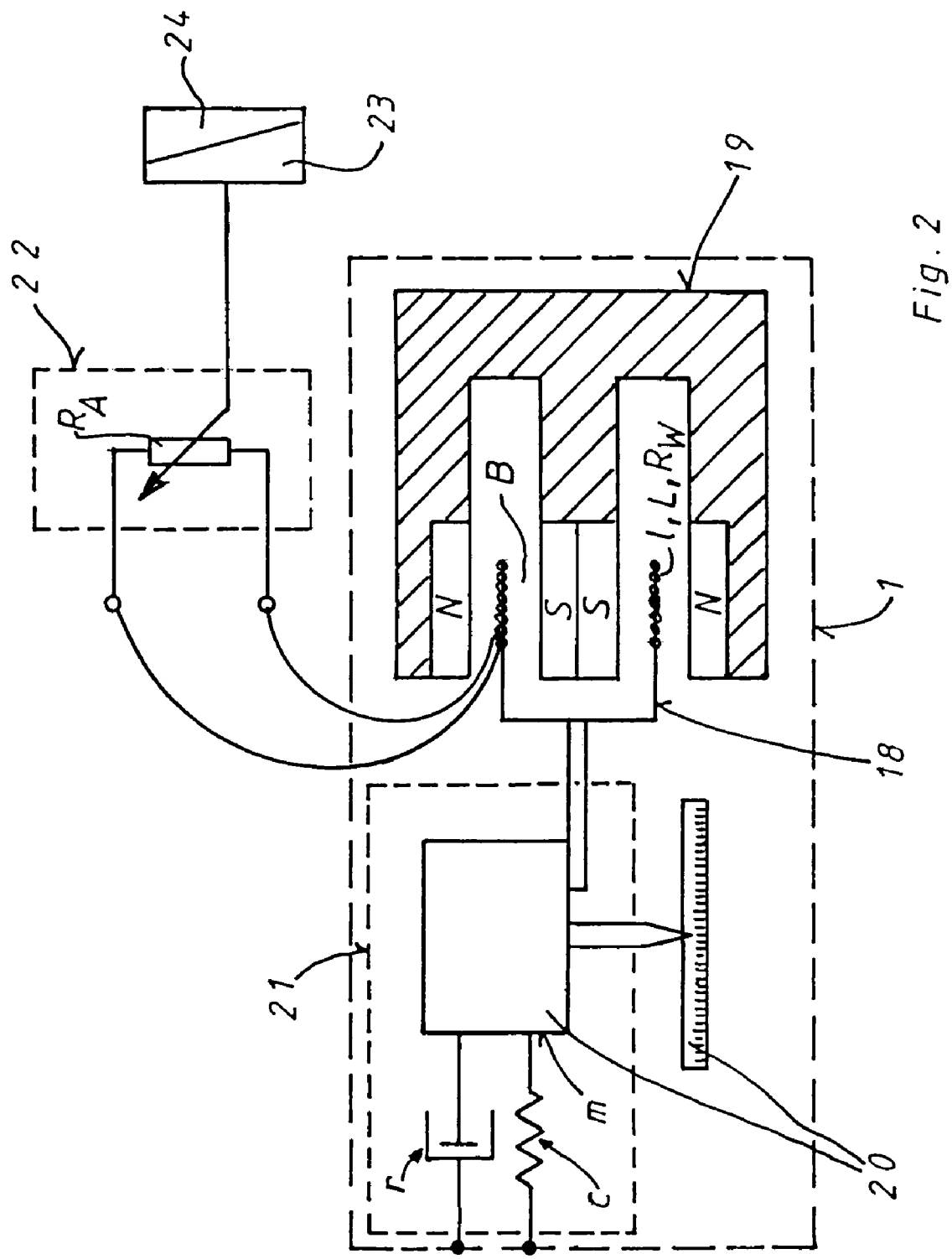
FIG. 2 shows a fundamental diagram of a damping device.

FIG. 2 shows a damping device according to the invention disposed in scanning head 1, having a plunger-type coil 18 that engages into a magnet 19. Plunger-type coil 18 is connected with a measurement system 20, so that vibrations of a mechanical vibration system 21 are transferred to plunger-type coil 18. Plunger-type coil 18 is connected with a negative ohmic resistor NIC 22, which can be adjusted by way of hardware 23 or firmware 24. NIC 22 is disposed outside of scanning head 1 because it heats up.

Proceeding from the transfer function of a general vibration equation $$H(s) = \frac{1}{1 + 2d\left(\frac{1}{2\pi f}\right)s + \left(\frac{1}{2\pi f}\right)^2 s^2}$$

where:
s=Laplace operator
d=attenuation constant of the speed-proportional damping
f=inherent frequency one obtains, by means of coefficient comparison with the transfer function of the mechanical vibration system without plunger-type coil system $$H(s) = \frac{1}{1 + \left(\frac{r}{c}\right)s + \left(\frac{m}{c}\right)s^2}$$

where:
m=mass
r=proportionality factor of the speed-proportional damping
c=stiffness the inherent frequency and the attenuation constant at $$f = \frac{1}{2\pi}\sqrt{\frac{c}{m}} \quad d = \frac{r}{2\sqrt{cm}}$$

and by means of coefficient comparison with the transfer function of the mechanical vibration system with plunger-type coil system $$H(s) = \frac{1}{1 + \left(\frac{r}{c} + \frac{B^2 l^2}{sLc + (R_A + R_W)c}\right)s + \left(\frac{m}{c}\right)s^2}$$

where:
B=magnetic flow intensity in the air gap
l=total length of the winding components that intersect the field lines
L=coil inductance
$R_A$=connection resistance as NIC
$R_W$=winding resistance and an approximation, by ignoring the complex resistance sL $$H(s) = \frac{1}{1 + \left(\frac{r}{c} + \frac{B^2 l^2}{(R_A + R_W)c}\right)s + \left(\frac{m}{c}\right)s^2}$$

the inherent frequency and the attenuation constant at $$f = \frac{1}{2\pi}\sqrt{\frac{c}{m}} \quad d = \frac{r}{2\sqrt{cm}} + \frac{B^2 l^2}{2\sqrt{cm}\,(R_A + R_W)}$$

For very large positive values of $R_A$, the second addend of d approaches zero, and the attenuation constant is exclusively determined by addends of d. The plunger-type coil system is then not effective, and the system corresponds to the mechanical vibration system without plunger-type coil system.

If the value of $R_A$ approaches the value $-R_W$, the attenuation constant is exclusively determined by the second addend of d, and assumes almost any desired high values.

Figure 3:
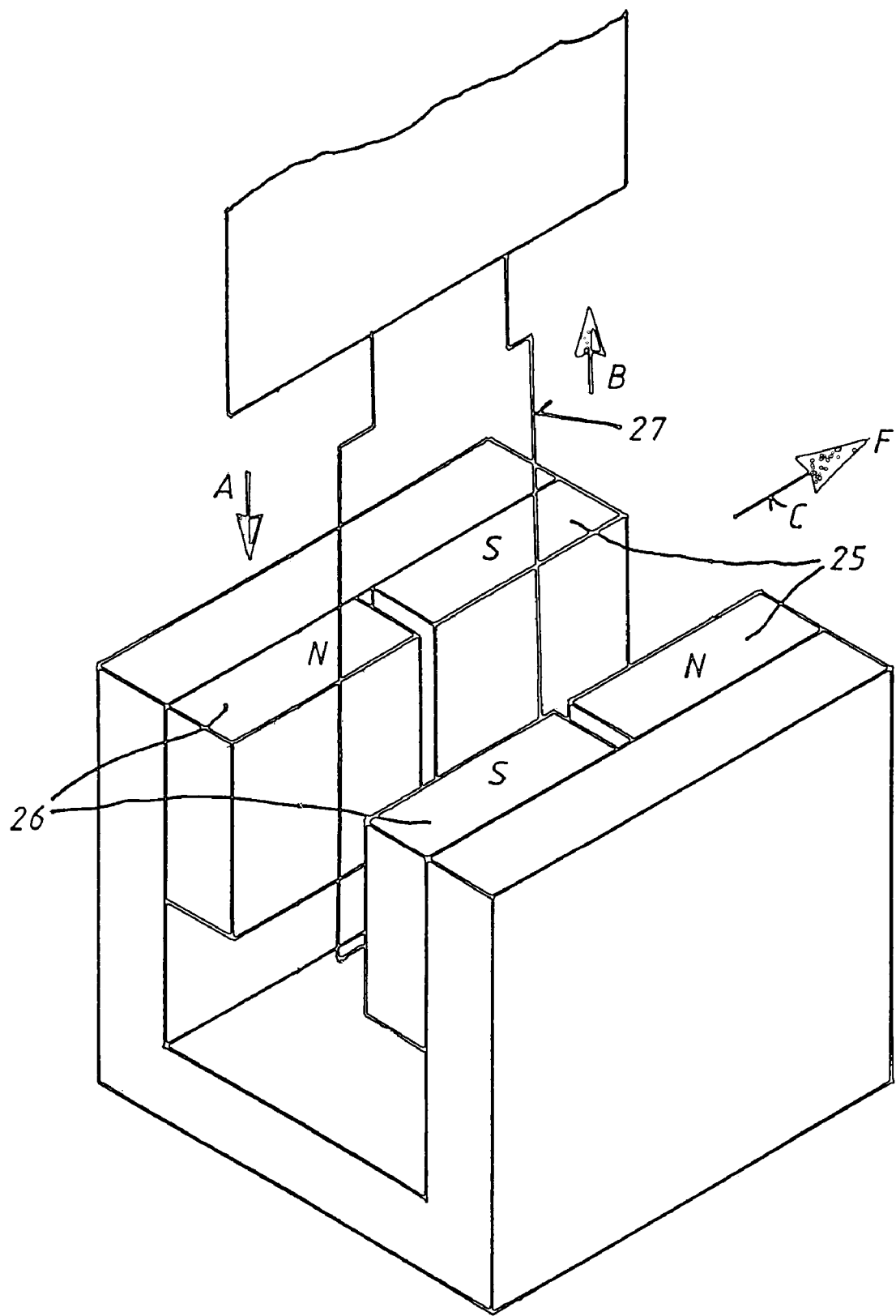
FIG. 3 shows a changed exemplary embodiment of a damping device.

FIG. 3 shows a damping device having magnets 25, 26. A flat coil 27 is disposed in an air gap between the magnets 25, 26. Magnets 25, 26 are connected with a fixed part of the scanning head rocker (not shown) and coil 27 is connected with a movable part of the scanning head rocker (not shown). The arrows A, B show the flow direction and the arrow C shows the resulting force F.

Accordingly, while only a few embodiments of the present invention have been shown and described, it is obvious that many changes and modifications may be made thereunto without departing from the spirit and scope of the invention.

REFERENCE NUMBERS 1 scanning head
2 scanning head rocker
3 scanning head rocker
4 scanning head rocker
2' fixed part of the scanning head rocker
3' fixed part of the scanning head rocker
4' fixed part of the scanning head rocker
2" movable part of the scanning head rocker
3" movable part of the scanning head rocker
4" movable part of the scanning head rocker
5 spring plate
6 spring plate
7 spring plate
8 feeler pickup
9 path measurement system
10 path measurement system
11 path measurement system
12 weight equalization spring
13 weight equalization spring
14 weight equalization spring
15 spindle nut
16 spindle
17 motor
18 plunger-type coil
19 magnet
20 measurement system
21 mechanical vibration system
22 NIC
23 hardware
24 software
25 magnet
26 magnet
27 coil
A arrow
B arrow
C arrow
F force

What is claimed is:
1. A scanning head for a coordinate measurement system, comprising:
a fixed part;
at least one part that is displaceable relative to the fixed part; and at least one damping device disposed in the scanning head for damping vibrations that occur, said damping device being configured as an electric motor connected with at least one negative ohmic resistor.

2. A scanning head according to claim 1, wherein the electric motor is configured as a plunger-type coil system.

3. A scanning head according to claim 1, wherein the electric motor is formed from at least one horseshoe magnet, in which a flat coil is disposed to be movable crosswise to magnetic field lines of the horseshoe magnet, and wherein an axis of symmetry of the coil, around which said coil is wound, is oriented in a direction of the magnetic field lines of the horseshoe magnet.

4. A scanning head according to claim 1, wherein a resistance value of the negative ohmic resistor is adjustable.

5. A scanning head according to claim 1, wherein the negative ohmic resistor comprises at least one Negative Impedance Converter (NIC).

6. A scanning head according to claim 5, wherein the NIC is disposed outside of the scanning head.

7. A scanning head according to claim 1, further comprising three scanning head rockers, and at least three of said electric motors, each scanning head rocker having at least one of said electric motors.

8. A scanning head according to claim 7, wherein all three electric motors are switched in series with a single negative resistor.

9. A scanning head according to claim 7, wherein each of the three electric motors is connected with its own negative resistor, each resistor having a resistance value that is adjustable independent of the other two negative resistors, by means of hardware or software.

* * * * *